United States Patent
Sirotkin et al.

(10) Patent No.: US 10,750,392 B2
(45) Date of Patent: Aug. 18, 2020

(54) RADIO RESOURCE CONTROL IN CELLULAR/WLAN AGGREGATION

(71) Applicant: Intel IP Corporation, Santa Clara, CA (US)

(72) Inventors: Alexander Sirotkin, Petach Tikva, M (IL); Shadi Iskander, Unterhaching, BY (DE); Jerome Parron, Fuerth, BY (DE); Karim E. Morsy, Nürnberg (DE)

(73) Assignee: Apple Inc., Cupertino, CA (US)

( * ) Notice: Subject to any disclaimer, the term of this patent is extended or adjusted under 35 U.S.C. 154(b) by 79 days.

(21) Appl. No.: 15/746,341

(22) PCT Filed: Dec. 24, 2015

(86) PCT No.: PCT/US2015/000333
§ 371 (c)(1),
(2) Date: Jan. 19, 2018

(87) PCT Pub. No.: WO2017/034508
PCT Pub. Date: Mar. 2, 2017

(65) Prior Publication Data
US 2018/0234869 A1      Aug. 16, 2018

Related U.S. Application Data

(60) Provisional application No. 62/208,186, filed on Aug. 21, 2015.

(51) Int. Cl.
*H04W 24/10* (2009.01)
*H04W 76/27* (2018.01)
(Continued)

(52) U.S. Cl.
CPC .......... *H04W 24/10* (2013.01); *H04W 24/08* (2013.01); *H04W 76/27* (2018.02); *H04W 84/12* (2013.01); *H04W 88/06* (2013.01); *H04W 88/10* (2013.01)

(58) Field of Classification Search
CPC ...... H04W 24/10; H04W 84/12; H04W 76/27
See application file for complete search history.

(56) References Cited

U.S. PATENT DOCUMENTS

2013/0242783 A1    9/2013  Horn et al.
2014/0161103 A1*   6/2014  Sirotkin ................ H04W 24/10
                                                              370/332
(Continued)

OTHER PUBLICATIONS

3GPP, "Technical Specification Group Radio Access Network; Evolved Universal Terrestrial Radio Access (E-UTRA); Radio Resource Control (RRC); Protocol specification (Release 12)," 3GPP TS 36.331 V12.6.0 (Jun. 2015), LTE Advanced, 449 pages.
(Continued)

*Primary Examiner* — Zhiren Qin
(74) *Attorney, Agent, or Firm* — Fish & Richardson P.C.

(57) ABSTRACT

Embodiments of the present disclosure describe systems, devices, and methods for radio resource control in an aggregation of cellular and wireless local area networks. In embodiments, a Radio Resource Control (RRC) ConnectionReconfiguration message may include WLAN measurement configuration information to indicate a WLAN Group of plural WLAN access points (APs) and to direct monitoring of the WLAN APs of the WLAN Group

25 Claims, 8 Drawing Sheets

(51) Int. Cl.
*H04W 24/08* (2009.01)
*H04W 88/10* (2009.01)
*H04W 88/06* (2009.01)
*H04W 84/12* (2009.01)

(56) References Cited

U.S. PATENT DOCUMENTS

| | | | | |
|---|---|---|---|---|
| 2015/0312850 | A1* | 10/2015 | Li | H04W 24/10 |
| | | | | 370/329 |
| 2016/0014667 | A1* | 1/2016 | Sirotkin | H04L 5/0094 |
| | | | | 370/252 |
| 2016/0080958 | A1* | 3/2016 | Rinne | H04W 24/10 |
| | | | | 370/338 |
| 2016/0302136 | A1* | 10/2016 | Bergstrom | H04L 41/0893 |
| 2017/0048739 | A1* | 2/2017 | Jeong | H04W 4/70 |
| 2018/0092147 | A1* | 3/2018 | Pelletier | H04L 63/0846 |
| 2018/0146390 | A1* | 5/2018 | Kim | H04W 88/08 |
| 2018/0152862 | A1* | 5/2018 | Nagasaka | H04W 48/18 |
| 2018/0176812 | A1* | 6/2018 | Zhang | H04W 36/00 |
| 2018/0192346 | A1* | 7/2018 | Nagasaka | H04W 28/08 |
| 2018/0227812 | A1* | 8/2018 | Nagasaka | H04W 88/06 |

OTHER PUBLICATIONS

International Search Report and Written Opinion dated Apr. 25, 2016 from International Application No. PCT/US2015/000333, 18 pages.
Mediatek Inc., "LTE/WLAN aggregation mobility aspects," 3GPP TSG-RAN2 #91 Meeting, R2-153814, Agenda Item: 7.6.2.1, Aug 24-28, 2015, Beijing, China 6 pages.
Huawei, Hisilicon, "RRM measurements for LTE-WLAN aggregation and interworking," 3GPP TSG-RAN WG2 Meeting #91, R2-153556, Agenda Item: 7.6.4, Aug. 24-28, 2015, Beijing, China, 4 pages.
Mediatek Inc., "WLAN Mobility with WLAN Group," 3GPP TSG-RAN2 #91 Meeting, R2-153248, Agenda Item: 7.6.2.1, Aug. 24-28, 2015, Beijing, China, 4 pages.

* cited by examiner

*RRCConnectionReconfiguration message*     400

-- ASN1START

```
RRCConnectionReconfiguration ::=        SEQUENCE {
    rrc-TransactionIdentifier               RRC-TransactionIdentifier,
    criticalExtensions                      CHOICE {
        c1                                      CHOICE{
            rrcConnectionReconfiguration-r8         RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture                SEQUENCE {}
    }
}
RRCConnectionReconfiguration-r8-IEs ::= SEQUENCE {
    measConfig                  MeasConfig                  OPTIONAL, -- Need ON
    mobilityControlInfo         MobilityControlInfo         OPTIONAL, -- Cond HO
    dedicatedInfoNASList        SEQUENCE (SIZE(1. maxDRB)) OF
                                    DedicatedInfoNAS        OPTIONAL, -- Cond nonHO
    radioResourceConfigDedicated   RadioResourceConfigDedicated  OPTIONAL, -- Cond HO
toEUTRA
    securityConfigHO            SecurityConfigHO            OPTIONAL, -- Cond HO
    nonCriticalExtension        RRCConnectionReconfiguration-v890-IEs   OPTIONAL
}
RRCConnectionReconfiguration-v890-IEs ::= SEQUENCE {
    lateNonCriticalExtension    OCTET STRING                OPTIONAL,
    nonCriticalExtension        RRCConnectionReconfiguration-v920-IEs  OPTIONAL
}
RRCConnectionReconfiguration-v920-IEs ::= SEQUENCE {
    otherConfig-r9              OtherConfig-r9              OPTIONAL, -- Need ON
    fullConfig-r9               ENUMERATED {true}           OPTIONAL, -- Cond HO
Reestab
    nonCriticalExtension        RRCConnectionReconfiguration-v1020-IEs OPTIONAL
}
```

*RRCConnectionReconfiguration message*
*(Continued)*

```
RRCConnectionReconfiguration-v1020-IEs ::=    SEQUENCE {
        sCellToReleaseList-r10           SCellToReleaseList-r10         OPTIONAL,  -- Need ON
        sCellToAddModList-r10            SCellToAddModList-r10          OPTIONAL,  -- Need ON
        nonCriticalExtension             RRCConnectionReconfiguration-v1130-IEs   OPTIONAL
}
RRCConnectionReconfiguration-v1130-IEs ::=    SEQUENCE {
        systemInfomationBlockType1Dedicated-r11 OCTET STRING (CONTAINING SystemInformationBlockType1)
                                                                        OPTIONAL,  -- Need ON
        nonCriticalExtension             RRCConnectionReconfiguration-v1250-IEs   OPTIONAL
}
RRCConnectionReconfiguration-v1250-IEs ::=    SEQUENCE {
        wlan-OffloadInfo-r12             CHOICE {
                release                          NULL,
                setup                            SEQUENCE {
                        wlan-OffloadConfigDedicated-r12     WLAN-OffloadConfig-r12,
                        t350-r12                            ENUMERATED {min5, min10, min20, min30, min60, min120,
                                                            min180, spare1} OPTIONAL   -- Need
OR
                }
        }                                                                OPTIONAL    -- Need
ON
        scg-Configuration-r12            SCG-Configuration-r12          OPTIONAL,   -- Cond
nonFullConfig
        sl-SyncTxControl-r12             SL-SyncTxControl-r12           OPTIONAL,   -- Need ON
        sl-DiscConfig-r12                SL-DiscConfig-r12    OPTIONAL,    -- Need ON
        sl-CommConfig-r12                SL-CommConfig-r12              OPTIONAL,   -- Need ON
        nonCriticalExtension             SEQUENCE {}                    OPTIONAL
}
SL-SyncTxControl-r12 ::=         SEQUENCE {
        networkControlledSyncTx-r12              ENUMERATED {on, off}   OPTIONAL   -- Need
OP
}
PSCellToAddMod-r12 ::=           SEQUENCE {
        sCellIndex-r12                   SCellIndex-r10,
        cellIdentification-r12           SEQUENCE {
                physCellId-r12                   PhysCellId,
                dl-CarrierFreq-r12               ARFCN-ValueEUTRA-r9
        }                                                               OPTIONAL,   -- Cond
SCellAdd
        radioResourceConfigCommonPSCell-r12      RadioResourceConfigCommonPSCell-r12 OPTIONAL, --
Cond SCellAdd
        radioResourceConfigDedicatedPSCell-r12   RadioResourceConfigDedicatedPSCell-r12        OPTIONAL,-
- Cond SCellAdd2
        ...
}
PowerCoordinationInfo-r12 ::=    SEQUENCE {
        p-MeNB-r12                       INTEGER (1..16),
        p-SeNB-r12                       INTEGER (1..16),
        powerControlMode-r12             INTEGER (1..2)
}
SCellToAddModList-r10 ::=    SEQUENCE (SIZE (1..maxSCell-r10)) OF SCellToAddMod-r10

SCellToAddMod-r10 ::=            SEQUENCE {
        sCellIndex-r10                   SCellIndex-r10,
        cellIdentification-r10           SEQUENCE {
                physCellId-r10                   PhysCellId,
                dl-CarrierFreq-r10               ARFCN-ValueEUTRA
        }                                                               OPTIONAL,     -- Cond SCellAdd
        radioResourceConfigCommonSCell-r10       RadioResourceConfigCommonSCell-r10   OPTIONAL,--
Cond SCellAdd
        radioResourceConfigDedicatedSCell-r10    RadioResourceConfigDedicatedSCell-r10         OPTIONAL, -
- Cond SCellAdd2
        ...
```

Fig. 4B

*RRCConnectionReconfiguration message*
*(Continued)*

400

```
          [[ dl-CarrierFreq-v1090              ARFCN-ValueEUTRA-v9e0         OPTIONAL -- Cond EARFCN-
max
          ]]
}
SCellToReleaseList-r10 ::=          SEQUENCE (SIZE (1..maxSCell-r10)) OF  SCellIndex-r10
SCG-Configuration-r12 ::=           CHOICE {
          release                   NULL,
          setup                     SEQUENCE {
                scg-ConfigPartMCG-r12         SEQUENCE {
                    scg-Counter-r12                  INTEGER  (0.. 65535)    OPTIONAL, -- Need
ON
                    powerCoordinationInfo-r12        PowerCoordinationInfo-r12   OPTIONAL, -- Need
ON
                      ...
                }                                                        OPTIONAL, -- Need ON
                scg-ConfigPartSCG-r12            SCG-ConfigPartSCG-r12   OPTIONAL -- Need ON
          }
}

SCG-ConfigPartSCG-r12 ::=           SEQUENCE {
       radioResourceConfigDedicatedSCG-r12  RadioResourceConfigDedicatedSCG-r12    OPTIONAL, -- Need
ON
          sCellToReleaseListSCG-r12         SCellToReleaseList-r10        OPTIONAL,      -- Need ON
          pSCellToAddMod-r12                PSCellToAddMod-r12            OPTIONAL,      -- Need ON
          sCellToAddModListSCG-r12   SCellToAddModList-r10         OPTIONAL,      -- Need ON
          mobilityControlInfoSCG-r12        MobilityControlInfoSCG-r12 OPTIONAL,   -- Need ON
          ...
}
RRCConnectionReconfiguration-v1300-IEs ::=   SEQUENCE {
          lwa-Configuration-r13      LWA-Configuration-r13              OPTIONAL,     -- Need ON
          nonCriticalExtension SEQUENCE {}                      OPTIONAL
}
LWA-Configuration-r13 ::=   SEQUENCE {
          wg-Config-r13              WG-Config-r13                OPTIONAL, -- Need ON
          lwa-Setup-r13              LWA-Setup-r13                OPTIONAL -- Need ON
}
WG-Config-r13 ::=   SEQUENCE {
          wgToReleaseList-r13   WGsToReleaseList-r13                     OPTIONAL,                -- Need ON
          wgToAddModList-r13 WGsToAddModList-r13                         OPTIONAL,                -- Need ON
...
}
LWA-Setup-r13 ::=   CHOICE {
          release                    NULL,
          setup                      SEQUENCE {
                wg-Id                       INTEGER (1..255),
                radioResourceConfigDedicatedWlan-r13 RadioResourceConfigDedicatedWlan-r13,
                lwa-Nonce-r13              INTEGER        OPTIONAL,       -- Need ON
...
          }
}
WGsToReleaseList-r13 ::=    SEQUENCE (SIZE (1..maxWLANs-r13)) OF INTEGER
WGsToAddModList-r13 ::=     SEQUENCE (SIZE (1..maxWLANs-r13)) OF WGToAddMod-r13
WGToAddMod-r13 ::=          SEQUENCE {
          wg-Id                      INTEGER (1..255),
          wlan-Id-List-r13           WLAN-Id-List-r13                    OPTIONAL,           -- Need ON
          wlan-ChannelsOrBandsList-r13 CHOICE {
                wlan-ChannelsList-r13         WLAN-ChannelsList-r13,
                wlan-BandsList-r13    WLAN-BandsList-r13
          }                                                     OPTIONAL,           -- Need ON
          ...
}
WLAN-ChannelsList-r13 ::=    SEQUENCE (SIZE (1..maxWLAN-Channels-r13)) OF INTEGER
```

*RRCConnectionReconfiguration message*
*(End)*

400

```
WLAN-BandsList-r13 ::=      SEQUENCE (SIZE (1..maxWLAN-Bands-r13)) OF WLAN-Band-r13
WLAN-Id-List-r13 ::=        SEQUENCE (SIZE (1..maxWLAN-Id-r13)) OF WLAN-Identifiers-r13
WLAN-Identifiers-r13 ::=    CHOICE {
        bssid-r13               OCTET STRING (SIZE (6))         OPTIONAL,       -- Need ON
        hessid-r13              OCTET STRING (SIZE (6))         OPTIONAL,       -- Need ON
        ...
}
WLAN-Band-r13 ::= ENUMERATED {mhz2400, mhz5000, all, spare}
SecurityConfigHO ::=        SEQUENCE {
        handoverType            CHOICE {
            intraLTE                    SEQUENCE {
                securityAlgorithmConfig     SecurityAlgorithmConfig     OPTIONAL,
                -- Cond fullConfig
                keyChangeIndicator   BOOLEAN,
                nextHopChainingCount        NextHopChainingCount
            },
            interRAT                SEQUENCE {
                securityAlgorithmConfig     SecurityAlgorithmConfig,
                nas-SecurityParamToEUTRA OCTET STRING (SIZE(6))
            }
        },
        ...
}
radioResourceConfigDedicatedWlan-r13 ::=        SEQUENCE {
        drb-ToAddModListWLAN-r13    DRB-ToAddModListWLAN-r13    OPTIONAL,       -- Need ON
        ...
}
```

Fig. 4D

RADIO RESOURCE CONTROL IN CELLULAR/WLAN AGGREGATION

RELATED APPLICATIONS

The present application is a national phase entry under 35 U.S.C. § 371 of International Application No. PCT/US2015/000333, filed Dec. 24, 2015, entitled "RADIO RESOURCE CONTROL IN CELLULAR/WLAN AGGREGATION", which designates the United States of America, which claims the benefit of priority under 35 U.S.C. § 119(e) of U.S. Provisional Application Serial No. US 62/208,186, filed Aug. 21, 2015, entitled "DETAILED (STAGE-3) RRC DESIGN FOR LTE/WLAN AGGREGATION (LWA)," the entire specifications of which are hereby incorporated by reference in their entireties for all purposes, except for those sections, if any, that are inconsistent with this specification.

FIELD

Embodiments of the present disclosure generally relate to the field of wireless communication, and more particularly, to methods and apparatuses for radio resource control in an aggregation of cellular and wireless local area networks.

BACKGROUND

Cellular communication may be aggregated over a wireless wide area or cellular network, such as a cellular radio network based on 3rd Generation Partnership Project (3GPP) Long Term Evolution (LTE) standards, and a wireless local area network (WLAN). Such cellular/WLAN aggregation may allow a cellular network to use a WLAN (e.g., WiFi) as a "virtual" or "extension" carrier in the cellular network. The reliability and wide coverage of the cellular network may provide control and a mobility anchor to facilitate seamless utilization of the WLAN. In such an operating environment, data flow may be offloaded from the cellular network to the WLAN while still being controlled by the cellular network.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 4 is an illustration of an RRCConnectionReconfiguration message in accordance with some embodiments.

DETAILED DESCRIPTION

Figure 1:
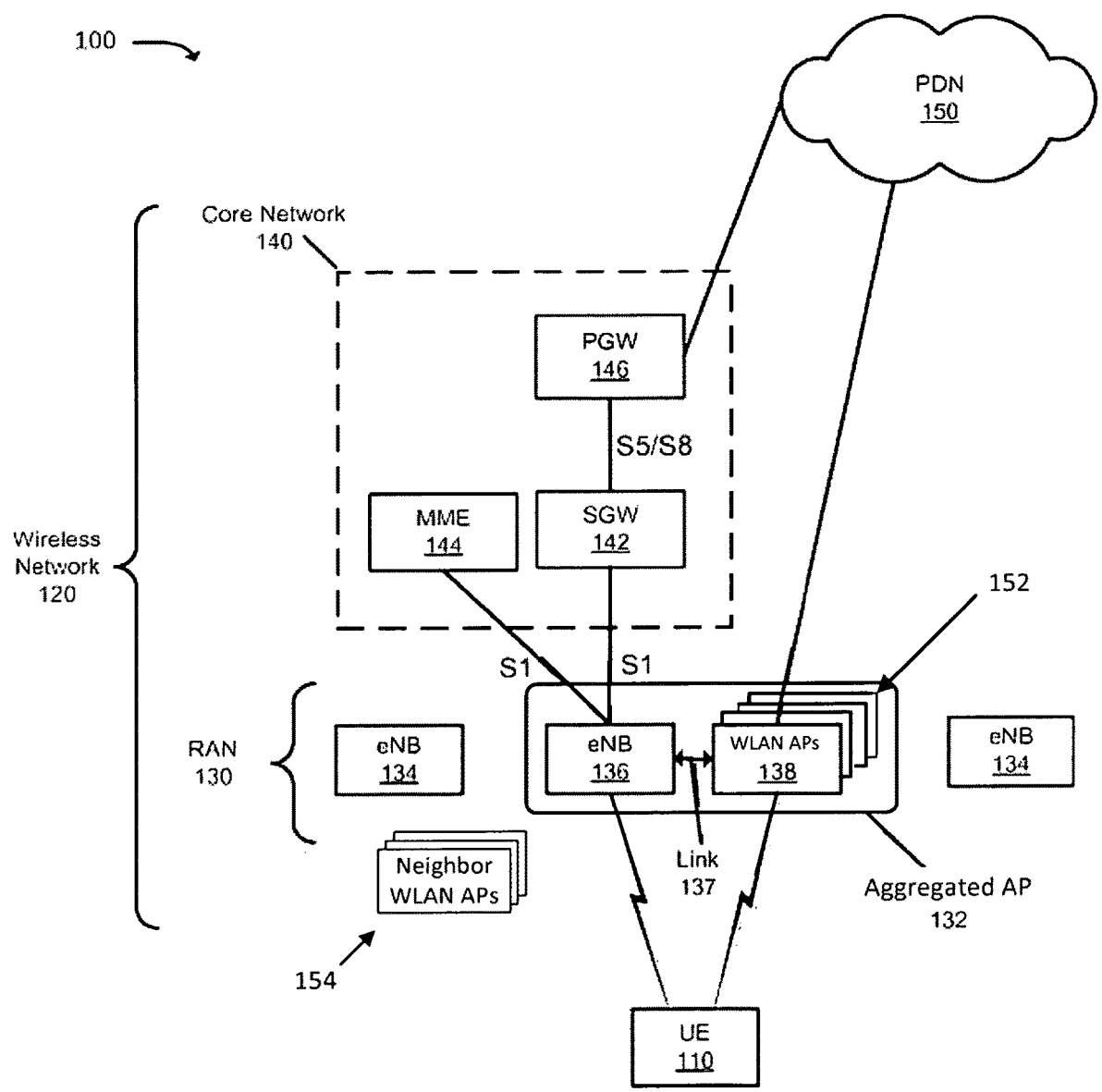
FIG. 1 is a diagram of an example operating environment in which systems and/or methods described herein may be implemented.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise. The phrases "A or B," "A/B," and "A and/or B" mean (A), (B), or (A and B).

Illustrative embodiments of the present disclosure include, but are not limited to, methods, systems, computer-readable media, and apparatuses that may enable aggregation of cellular communication over a wireless wide area or cellular network, such as a cellular radio network based on 3rd Generation Partnership Project (3GPP) Long Term Evolution (LTE) standards, and one or more wireless local area networks (WLANs). In embodiments, such an aggregation may be referred to as a cellular/WLAN aggregation or an LTE/WLAN Aggregation (LWA), for example.

As used herein, WLAN may refer to a wireless computer network that links two or more devices using wireless communication over relatively short ranges. A WLAN may be used to create wireless networks within a limited area such as a home or office building. One example of a radio technology that may be used to implement a WLAN is WiFi (e.g., using Institute of Electrical and Electronics Engineers' (IEEE) 802.11-based standards). In contrast to WLANs, cellular networks may refer to networks that provide wireless access over larger areas, such as a cellular radio network based on 3GPP LTE standards.

An aggregated cellular/WLAN Radio Access Technology (RAT) operating environment is described herein. The aggregated operating environment may allow for coupling between a WLAN and a cellular network and for a Radio Access Network (RAN) in which simultaneous use of radio resources between a cellular RAT and a WLAN RAT is employed. The operating environment may allow for use of a cellular network (e.g., a 3GPP LTE link), with a WLAN (e.g., WiFi) operating as a "virtual" or "extension" carrier in the cellular network. The reliability and wide coverage of the cellular network may provide control and a mobility anchor to facilitate seamless utilization of one or more WLANs. In such an operating environment, data flow may be offloaded from a cellular network to a WLAN, while still being controlled by the cellular network.

FIG. 1 is a diagram of an example operating environment 100 in which systems and/or methods described herein may be implemented. As illustrated, environment 100 may include user equipment (UE) 110, which may obtain network connectivity from wireless network 120. Although a single UE 110 is shown for simplicity in FIG. 1, in practice, multiple UEs 110 may operate in the context of wireless network 120. Wireless network 120 may provide access to one or more external networks, such as packet data network (PDN) 150. The wireless network 120 may include a radio access network (RAN) 130 and a core network 140. Some or all of RAN 130 may be associated with a network operator that controls or otherwise manages core network 140. Core network 140 may include an Internet Protocol (IP)-based network, such as a System Architecture Evolution (SAE) core network or a General Packet Radio Service (GPRS) core network, for example.

UE 110 may include a portable computing and communication device, such as a personal digital assistant (PDA), a smart phone, a cellular phone, a laptop computer with connectivity to a cellular wireless network, a tablet computer, etc. UE 110 may also include non-portable computing devices, such as desktop computers, consumer or business appliances, or other devices that have the ability to wirelessly connect to RAN 130.

RAN 130 may represent a 3GPP access network that includes one or more access technologies. For example, RAN 130 may include base stations. In the context of an LTE-based access network, base stations may be referred to as evolved NodeBs (eNBs), which are illustrated as eNBs 134 and 136. Some of the eNBs, such as eNB 136, may be associated with an aggregated access point (AP), such as aggregated AP 132. Aggregated AP 132, in addition to providing functionality associated with eNB 136, may also include one or more WLAN (e.g., WiFi) access points (WLAN APs) 138 (multiple shown). Aggregated AP 132 may provide RAN-based coordination and simultaneous use of the radio resources between different RATs (e.g., 3GPP (cellular) and WiFi (WLAN)).

In some implementations, aggregated AP 132 may be implemented such that eNB 136 and APs 138 may be physically co-located as part of an aggregated multi-radio small cell. Alternatively or additionally, aggregated APs 132 may be implemented such that eNB 136 and APs 138 are physically separated but logically co-located, such as via an external, low-latency standardized or proprietary interface that may be used to connect eNB 136 with APs 138. In either case, link 137, which may include a proprietary or other type of low-latency interface, may be implemented between eNB 136 and APs 138. The coverage ranges of eNB 136 and APs 138 may be different and may or may not overlap.

Core network 140 may include an IP-based network. In the 3GPP network architecture, core network 140 may include an Evolved Packet Core (EPC). As illustrated, core network 140 may include serving gateway (SGW) 142, Mobility Management Entity (MME) 144, and packet data network gateway (PGW) 146. Although certain network devices are illustrated in environment 100 as being part of RAN 130 and core network 140, whether a network device is labeled as being in the "RAN" or the "core network" of environment 100 may be an arbitrary decision that may not affect the operation of wireless network 120.

SGW 142 may include one or more network devices that aggregate traffic received from one or more eNBs 134/136. SGW 142 may generally handle user (data) plane traffic. MME 144 may include one or more computation and communication devices that perform operations to register UE 110 with core network 140, establish bearer channels associated with a session of the UE 110, hand off UE 110 from one eNodeB to another, and/or perform other operations. MME 144 may generally handle control plane traffic. PGW 146 may include one or more devices that act as the point of interconnect between core network 140 and external IP networks, such as PDN 150, and/or operator IP services. PGW 146 may route packets to and from the access networks and the external IP networks. PDN 150 may include one or more packet-based networks, including a public network (e.g., the Internet) or proprietary networks that provide services that are provided by the operator of core network 140 (e.g., IP multimedia (IMS)-based services, transparent end-to-end packet-switched streaming services (PSSs), or other services).

A number of communication interfaces, between various devices, are labeled in FIG. 1. The labeled communication interfaces may represent various protocols that may be used to communicate between the various devices illustrated in FIG. 1. For example, eNBs 134 and 136 may communicate with SGW 142 using the 3GPP standardized S1 interface, and SGW 142 may communicate with PGW 146 using the 3GPP standardized S5/S8 interface.

The quantity of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1. Alternatively, or additionally, one or more of the devices of operating environment 100 may perform one or more functions described as being performed by another one or more of the devices of environment 100.

Figure 2:
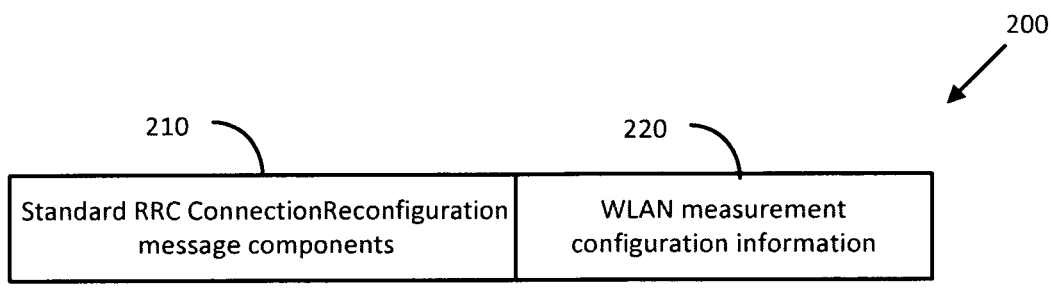
FIG. 2 is an illustration of RRCConnectionReconfiguration message that in embodiments may include standard RRC ConnectionReconfiguration message components and also may include WLAN measurement configuration information.

Control plane communication between UE 110 and wireless network 120 may include a Radio Resource Control (RRC) protocol, which may further include an RRC Connection Reconfiguration (RRCConnectionReconfiguration) message transmitted from wireless network 120 (e.g., eNB 136) to UE 110 to modify communication or connection between wireless network 120 and UE 110, and may further convey information relating to the communication or connection. FIG. 2 is an illustration of RRCConnectionReconfiguration message 200 that in embodiments may include standard RRCConnectionReconfiguration message components 210 and also may include WLAN measurement configuration information 220 to indicate to UE 110 a WLAN Group (152, FIG. 1) of plural WLAN APs 138 and to direct the WLAN baseband circuitry to monitor the WLAN APs 138 of the WLAN Group 152. Referring to FIG. 1, operating environment 100 may include one or more other or "neighbor" WLAN APs 154, which are not included in WLAN Group 152, but which may be included in other or neighbor WLANs and may otherwise be aggregated with cellular elements of network 120. Standard RRCConnectionReconfiguration message components 210 may relate to a wide range of RRC Connection parameters, such as those set forth in the Radio Resource Control protocol of the 3GPP LTE standard, such as TS 36.331, for example.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

WLAN measurement configuration information 220 may further include any or all of various parameters or indications. In embodiments, WLAN measurement configuration information 220 may indicate information regarding the WLAN APs 138 of the WLAN Group 152. The information may include any or all of WLAN identifiers, WLAN channels and WLAN bands. The WLAN identifiers may list or identify the WLAN APs of the WLAN Group, the WLAN Channels may list or identify the WLAN Channels of the WLAN Group, and the WLAN Bands may list or identify the WLAN Bands of the WLAN Group. In embodiments, WLAN measurement configuration information 220 of RRCConnectionReconfiguration message 200 may accordingly include any or all of the following fields:

wg-Id—WLAN group identifier;

wlan-Id-List—List of WLAN identifiers belonging to the WLAN group, wherein the WLAN identifiers may include one or more of Homogenous Extended Service Set Identifiers (HESSIDs), Basic Service Set Identifiers (BSSIDs), and Service Set Identifiers (SSIDs) for the plural WLAN access points (APs) 138 of the WLAN Group 152;

wlan-ChannelsList—List of WLAN channels belonging to the WLAN group;

wlan-BandsList—List of WLAN bands'belonging to the WLAN group; and In embodiments, wg-Id, wlan-Id-List, wlan-ChannelsList, wlan-BandsList, and WLANAdd may be fields of RRCConnectionReconfiguration.

WLAN measurement configuration information 220 may indicate one or more measurements UE 110 may make of the WLAN AP 138 of the WLAN Group 152. UE 110 may report or transmit any or all of the one or more measurements to wireless network 120 (e.g., eNB 136) and/or may change connection or roam between the WLAN APs 138 of the WLAN Group 152 according to any of the measurements. For example, the measurement of the WLAN APs 138 in the WLAN Group 152 may include any or all of a Beacon Received Signal Strength Indicator (RSSI), a channel utilization measurement indicating utilization of the WLAN channels (e.g., as a percentage of capacity) of WLAN APs 138 in the WLAN Group 152, and a station count indicating a count of WLAN stations connected to the WLAN APs 138 in the WLAN Group 152. In embodiments, WLAN measurement configuration information 220 of RRCConnectionReconfiguration 200 may accordingly include any or all of the following fields:

Threshold WLAN—WLAN Beacon RSSI threshold;

wlan-staCount—If this field is set, the UE may measure and/or report on WLAN station count (in embodiments, the UE may perform the WLAN station count measurements on serving and neighbor WLANs, as described below);

wlan-channelUtilization—If this field is set, the UE reports WLAN channel utilization; and wlan-UtilizationRate—If this field is set, the UE may measure and/or report on WLAN channel utilization. In embodiments, the UE may perform WLAN Utilization Rate measurements on the serving and neighbor WLANs.

WLAN measurement configuration information 220 may indicate one or more report configurations or conditions according to which UE 110 may report or transmit to wireless network 120 (e.g., eNB 136) information or measurements of the WLAN APs 138 of the WLAN Group 152. In embodiments, WLAN measurement configuration information 220 may include ReportConfigWLAN information element with an eventId field to indicate a WLAN event criterion to trigger a WLAN measurement reporting event in which UE 110 may report or transmit information or measurements to wireless network 120 (e.g., eNB 136). The eventId field may be, based on information or measurements relating to one or more serving WLANs, which may include APs 138 of WLAN Group 152, and one or more neighbor WLAN APs 154. For example, an eventID field value W1 may indicate that a measurement or performance of a neighbor WLAN APs 154 exceeds a preselected threshold, an eventID field value W2 may indicate a measurement or performance of the WLAN APs 138 of WLAN Group 152 is below a preselected threshold, and an eventID field value W3 may indicate a measurement or performance of the WLAN APs 138 of WLAN Group 152 is below a first preselected threshold and that a measurement or performance of the neighbor WLAN APs 154 exceeds a second preselected threshold.

WLAN measurement configuration information 220 may indicate one or more other fields relating to information or measurements about the WLAN APs 138 of the WLAN Group 152. In embodiments, WLAN measurement configuration information 220 may include a maxReportCells field to indicate a maximum number of WLAN APs 138, to include in a measurement report sent or transmitted to wireless network 120 (e.g., eNB 136). WLAN measurement configuration information 220 may include a reportAmount field to indicate a number of measurement reports applicable to a triggerType event as well as a triggerType periodical, which may correspond to one of eventID field values W1-W3. A timeToTrigger may indicate a measurement report triggering time and may be implemented by UE 110 and may not be signaled by wireless network 120. In embodiments, fields eventId, maxReportCells, reportAmount, Threshold WLAN, wlan-staCount, wlan-channelUtilization may be associated with or fields of ReportConfig-WLAN information element.

Standard RRCConnectionReconfiguration message components 210 and/or WLAN measurement configuration information 220 may indicate one or more other fields relating to information or measurements about the WLAN APs 138 of the WLAN Group 152. Standard RRCConnectionReconfiguration message components 210 and/or WLAN measurement configuration information 220 may include one or more fields that may relate to a status reporting configuration for packet data convergence protocol (PDCP) packet data units (PDUs), one or more fields that may relate to adding, modifying, or releasing WLAN APs 138 of the WLAN Group 152 (e.g., WGToAddMod), and/or one or more fields that may relate to bearer configuration procedures in the cellular/WLAN aggregation, which may include cellular/WLAN split bearer establishment and/or cellular/WLAN split bearer modification.

In embodiments, a pduCount field may indicate that the UE 110 shall send PDCP status reports after a certain number of PDCP PDUs, a statusTimer field may indicate that the UE 110 shall send PDCP status reports periodically, with a value in milliseconds in which "ms40" means 40 milliseconds, "ms60" means 60 millisecnds, etc., and a t-ReorderingExpiry field may indicate that the UE 110 shall send PDCP status reports whenever t-reordering time expires and the PDU is not received successfully. A quantityConfigWLAN field of a QuantityConfig information element may specify a measQuantityWLAN field as an enumerated value and filter configurations for WLAN measurements in a filterCoefficient field. The pduCount, statusTimer, and t-ReorderingExpiry may be associated with or fields of a PDCP-Config information element.

A measResultsListWLAN field may include a list of measured results for a maximum number of reported best WLANs for a WLAN measurement identity. A measResultServingWLAN field may list measured results of the serving WLAN, the measurement result of the WLAN serving cell, if any. In embodiments, this field may be mandatory if the cellular/WLAN aggregation is active. MeasResultsListW- LAN and measResultServingWLAN may be fields of a MeasResults information element.

In embodiments, a standard RRCConnectionReconfiguration message component 210, such as measObject information element, may include a type such as measObjectWLAN, which may specify information applicable to a WLAN to be measured. The measObjectWLAN information element may include a wg-Id field, which may indicate or identify one or more WLAN Group to be measured. A measObject relating to a WLAN may be applied to a wlan cell on an associated set of wlan channels. The wlan cell may be included in a list wlan-Id-List defined within a WGToAddMod field of a wgId for a measId, which may indicate a measurement.

Information that UE 110 transmits or reports to wireless network 120 (e.g., eNB 136) UE 110 may also include a status indication to indicate a status of communication between the UE 110 and the WLAN APs 138 of the WLAN Group 152. For example, the status indication may indicate that the UE 110, is entering or leaving communication with or coverage by the WLAN APs 138 of the WLAN Group 152. The UE 110 may provide the status indication with a WLANConnectionStatusReport message to indicate a status of communication between the UE and the WLAN Group. In embodiments, the WLANConnectionStatusReport message may include a field (e.g., wlanNotAvailableIndication) to indicate that UE 110 can no longer use the WLAN APs 138 of the WLAN Group 152, and/or a wlanAssociationSuccess field to indicate successful association with at least one of the WLAN APs 138 of the WLAN Group 152. For example, the wlanNotAvailableIndication field may be positive when a user or operator turns off a WLAN or goes out of WLAN coverage. In other embodiments, the UE 110 may report whether or not it is connected to a WLAN AP 138 and, if not, may separately report a reason for the disconnect and/or failure. WLANConnectionStatusReport message may also indicate other information relating to cellular/WLAN aggregation including any or all of signaling radio bearer (e.g., SRB1), Radio Link Control—Service Access Points (RLC-SAP) (e.g., AM), logical channel (e.g., DCCH), direction (e.g., UE to E-UTRAN). In embodiments, UE 110 may provide the status indication and/or the WLAN-ConnectionStatusReport message at one or more times according to timing or scheduling conditions or criteria (e.g., periodic, scheduled, etc.), which UE 110 may receive from wireless network 120 in connection with RRCConnection-Reconfiguration message.

Figure 3:
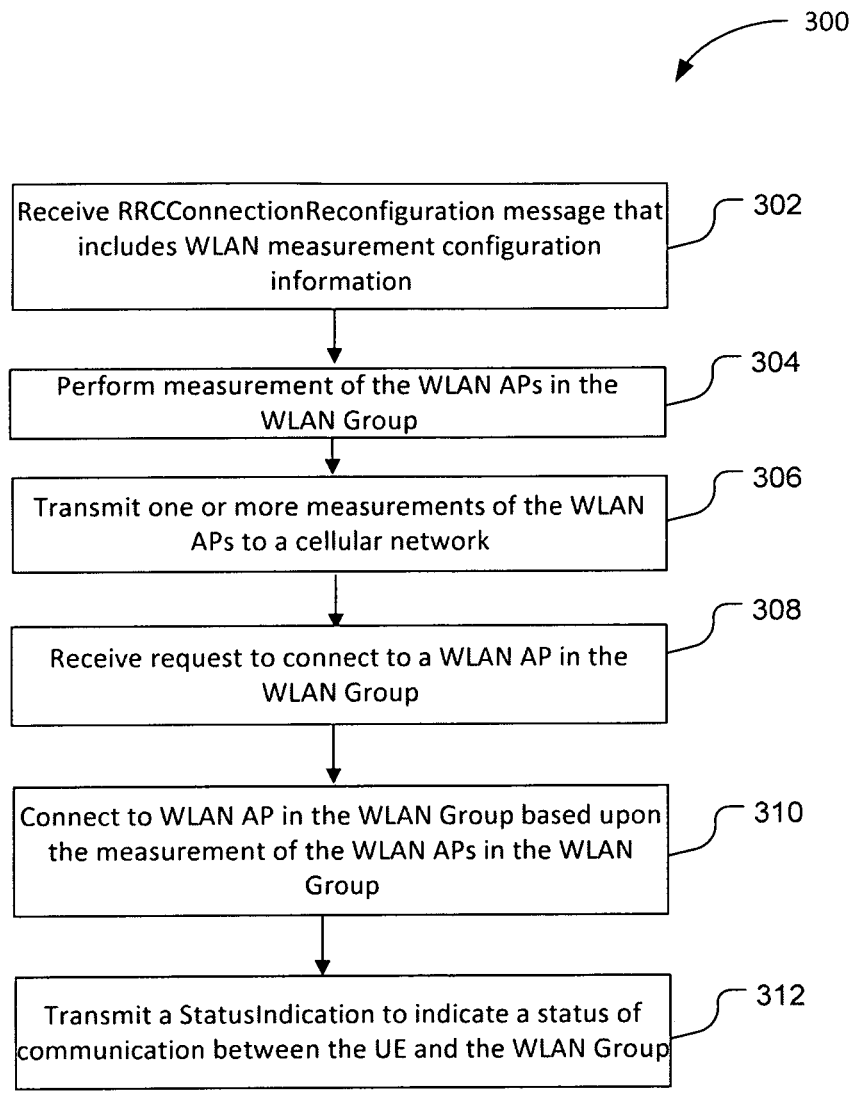
FIG. 3 is a flowchart 300 describing operations of a UE in accordance with some embodiments.

FIG. 3 is a flowchart 300 describing operations of a UE in accordance with some embodiments.

At 302, the UE may receive an RRCConnectionReconfiguration message that includes WLAN measurement configuration information to indicate a WLAN Group of plural WLAN APs. In embodiments, the WLAN Group may include WLAN Group 152 and the plural WLAN APs may include WLAN APs 138.

At 304, the UE may perform measurement of the WLAN APs in the WLAN Group. In embodiments, the measurement of the WLAN APs in the WLAN Group may include any or all of a Beacon RSSI measurement, a channel utilization measurement indicating utilization of the WLAN channels (e.g., as a percentage of capacity), and a station count indicating a count of WLAN stations the WLAN APs 138 in the WLAN Group 152

At 306, the UE may transmit one or more measurements of the WLAN APs to a cellular network. For example, UE 110 may send or transmit one or more measurements of the WLAN APs 138 to wireless network 120 (e.g., eNB 136). In embodiments, the measurement of one of the WLAN APs in the WLAN Group may indicate greater performance than the measurement of the other WLAN APs in the WLAN Group, and at 306 the UE may transmit only the measurement of the one of the WLAN APs with the measurement that indicates greater performance.

At 308, the UE may receive from the cellular network a request to connect to a WLAN AP in the WLAN Group.

At 310, the UE may connect to one of the WLAN APs in the WLAN Group based upon the measurement of the WLAN APs in the WLAN Group. In embodiments, the UE 110 may connect or roam to different WLAN APs 138 in the WLAN Group 152 based on measurements of the WLAN APs 138. This may provide the UE 110 with mobility among WLAN APs 138 in the WLAN Group 152, and the mobility may be handled by the UE 110 and may be transparent to wireless network 120 (e.g., eNB 136). For example, the WLAN APs 138 of the WLAN Group 152 may be connected to a common WLAN Termination.

At 312, the UE may transmit a WLANConnectionStatusReport to indicate a status of communication between the UE and the WLAN Group. In embodiments, the status of communication between the UE and the WLAN may include that the UE is not in communication with the WLAN Group and/or, that the UE is in communication with the WLAN Group. In embodiments, the UE may transmit a WLANConnectionStatusReport if a current active connection fails.

FIGS. 4A-4D is an illustration of an RRCConnectionReconfiguration message 400 in accordance with some embodiments. Message 400 illustrates fields that may be included in embodiments of an RRCConnectionReconfiguration message. The fields may include:

lwa-Configuration field, which may be a sequence and may include a wg-Config field relating to WLAN Group configuration and a lwa-Setup field relating to setup of a cellular/WLAN aggregation;
    wg-Config field may be a sequence that may include a
        wgToReleaseList field as a sequence of WLAN Groups to release (e.g., indicated as integers) and a wgToAddModList field as a sequence that may include WLAN Groups to add to or modify in a listing
        wgToAddModList field may include a wg-Id field, a wlan-Id-List field, and a wlan-ChannelsOrBandsList field,
            wlan-Id-List field may include a sequence of wlan-identifier fields, which may include bssid, hessid, and ssid
            the wlan-ChannelsOrBandsList field may include a wlan-ChannelsList field as a sequence of integers representing channels, and a wlan-BandsList field as a sequence of WLAN-Band fields, which may be an enumerated indication of bands (e.g., mhz2400, mhz5000, all, spare, etc.)
    a lwa-Setup field may include a release field indicating a release of the lwa-Setup and a setup field as a sequence that may include a wg-Id field, a lwa-Nonce field, and a radioResourceConfigDedicatedWlan field, which may include a DRB-ToAddModListWLAN field as a sequence of DRB-ToAddModWLAN fields
        the DRB-ToAddModWLAN field may include a drb-Identity field
    indicating DRB identity and an enumerated drb-Type field.

It will be appreciated that message 400 is an illustration of an example

RRCConnectionReconfiguration message and that in other embodiments RRCConnectionReconfiguration message may include any RRCConnectionReconfiguration message component, element, or field described herein.

Figure 5:
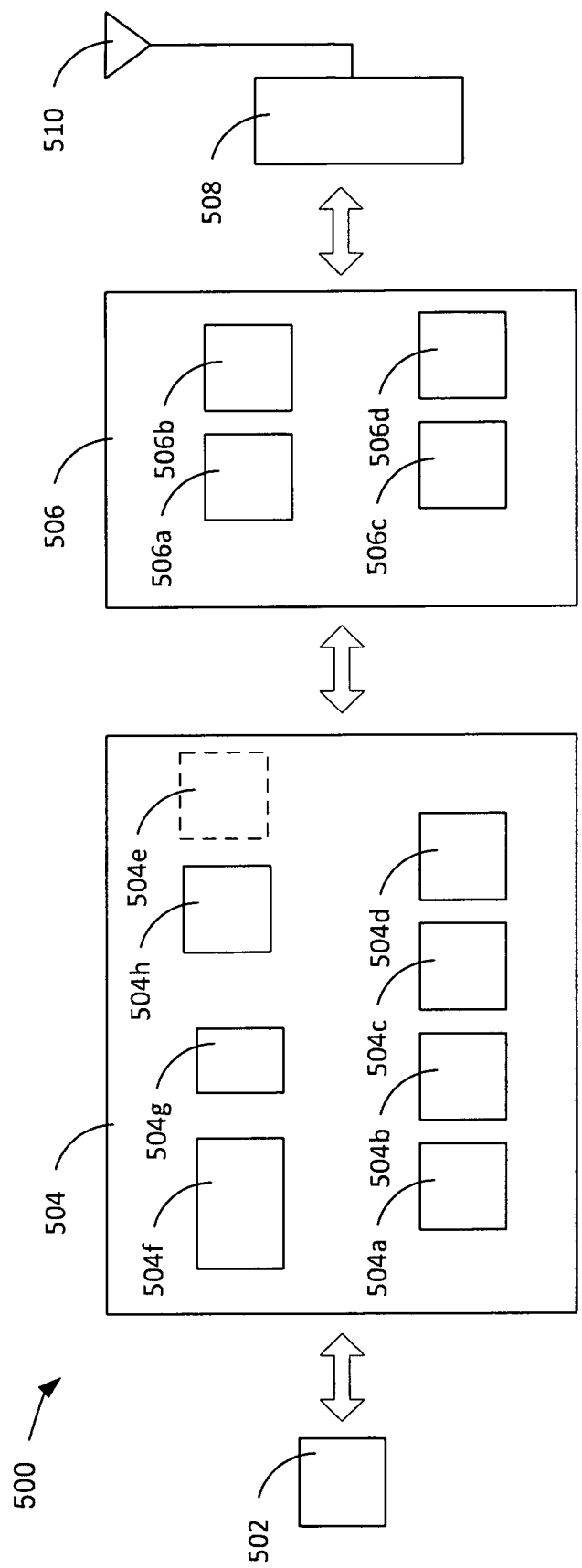
FIG. 5 illustrates, for one embodiment, example components of an electronic device.

Embodiments described herein may be implemented into a system using any suitably configured hardware and/or software. FIG. 5 illustrates, for one embodiment, example components of an electronic device 500. In embodiments, the electronic device 500 may be, implement, be incorporated into, or otherwise be a part of a UE, an eNB, or some other suitable electronic device. In some embodiments, the electronic device 500 may include application circuitry 502, baseband circuitry 504, Radio Frequency (RF) circuitry 506, front-end module (FEM) circuitry 508 and one or more antennas 410, coupled together at least as shown.

The application circuitry 502 may include one or more application processors. For example, the application circuitry 502 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 504 may include circuitry such as, but not limited to, one or more single-core or multi-core processors. The baseband circuitry 504 may include one or more baseband processors and/or control logic to process baseband signals received from a receive signal path of the RF circuitry 506 and to generate baseband signals for a transmit signal path of the RF circuitry 506. Baseband processing circuity 504 may interface with the application circuitry 502 for, generation and processing of the baseband signals and for controlling operations of the RF circuitry 506. For example, in some embodiments, the baseband circuitry 504 may include a second generation (2G) cellular baseband processor 504a, third generation (3G) cellular baseband processor 504b, fourth generation (4G) cellular baseband processor 504c, and/or other cellular baseband processor(s) 504d for other existing generations, generations in development or to be developed in the future (e.g., fifth generation (5G), 6G, etc.). In embodiments, the electronic device 500 may implement, be incorporated into, or otherwise be a part of a UE that may include a WLAN (e.g., Wi-Fi) baseband processor or circuitry 504e. The baseband circuitry 504 (e.g., one or more of cellular baseband processors 504a-d and, in embodiments, a WLAN baseband processor 504e) may handle various radio control functions that enable communication with one or more radio networks via the RF circuitry 506. The radio control functions may include, but are not limited to, signal modulation/demodulation, encoding/decoding, radio frequency shifting, etc. In some embodiments, modulation/demodulation circuitry of the baseband circuitry 504 may include Fast-Fourier Transform (FFT), precoding, and/or constellation mapping/demapping functionality. In some embodiments, encoding/decoding circuitry of the baseband circuitry 504 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 504 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 504f of the baseband circuitry 504 may be configured to run elements of the protocol stack for signaling of the PHY, MAC, RLC, PDCP and/or RRC layers. In some embodiments, the baseband circuitry may include one or more audio digital signal processor(s) (DSP) 504g. The audio DSP(s) 504g may be include elements for compression/decompression and echo cancellation and may include other suitable processing elements in other embodiments.

The baseband circuitry 504 may further include memory/storage 504h. The memory/storage 504h may be used to load and store data and/or instructions for operations performed by the processors of the baseband circuitry 504. Memory/storage for one embodiment may include any combination of suitable volatile memory and/or non-volatile memory. The memory/storage 504h may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 504h may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 504 and the application circuitry 502 may be implemented together such as, for example, on a system on a chip (SOC).

In some embodiments, the baseband circuitry 504 may provide for communication compatible with one or more radio technologies. For example, in some embodiments, the baseband circuitry 504 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 504 is configured to support radio communications of more than one wireless protocol may be referred to as multi-mode baseband circuitry.

RF circuitry 506 may enable communication with wireless networks using modulated electromagnetic radiation through a non-solid medium. In various embodiments, the RF circuitry 506 may include switches, filters, amplifiers, etc. to facilitate the communication with the wireless network. RF circuitry 506 may include a receive signal path which may include circuitry to down-convert RF signals received from the FEM circuitry 508 and provide baseband signals to the baseband circuitry 504. RF circuitry 506 may also include a transmit signal path which may include circuitry to up-convert baseband signals provided by the baseband circuitry 504 and provide RF output signals to the FEM circuitry 508 for transmission.

In some embodiments, the RF circuitry 506 may include a receive signal path and a transmit signal path. The receive signal path of the RF circuitry 506 may include mixer circuitry 506a, amplifier circuitry 506b and filter circuitry 506c. The transmit signal path of the RF circuitry 506 may include filter circuitry 506c and mixer circuitry 506a. RF circuitry 506 may also include synthesizer circuitry 506d for synthesizing a frequency for use by the mixer circuitry 506a of the receive signal path and the transmit signal path. In some embodiments, the mixer circuitry 506a of the receive signal path may be configured to down-convert RF signals received from the FEM circuitry 508 based on the synthesized frequency provided by synthesizer circuitry 506d. The amplifier circuitry 506b may be configured to amplify the down-converted signals and the filter circuitry 506c may be a low-pass filter (LPF) or band-pass filter (BPF) configured to remove unwanted signals from the down-converted signals to generate output baseband signals. Output baseband signals may be provided to the baseband circuitry 504 for further processing. In some embodiments, the output baseband signals may be zero-frequency baseband signals, although this is not a requirement. In some embodiments, mixer circuitry 506a of the receive signal path may comprise passive mixers, although the scope of the embodiments is not limited in this respect.

In some embodiments, the mixer circuitry 506a of the transmit signal path may be configured to up-convert input baseband signals based on the synthesized frequency provided by the synthesizer circuitry 506d to generate RF output signals for the FEM circuitry 508. The baseband signals may be provided by the baseband circuitry 504 and may be filtered by filter circuitry 506c. The filter circuitry 506c may include a low-pass filter (LPF), although the scope of the embodiments is not limited in this respect.

In some embodiments, the mixer circuitry 506a of the receive signal path and the mixer circuitry 506a of the transmit signal path may include two or more mixers and may be arranged for quadrature downconversion and/or upconversion respectively. In some embodiments, the mixer circuitry 506a of the receive signal path and the mixer circuitry 506a of the transmit signal path may include two or more mixers and may be arranged for image rejection (e.g., Hartley image rejection). In some embodiments, the mixer circuitry 506a of the receive signal path and the mixer circuitry 506a may be arranged for direct downconversion and/or direct upconversion, respectively. In some embodiments, the mixer circuitry 506a of the receive signal path and the mixer circuitry 506a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 506 may include analog-to-digital converter (ADC) and digital-to-analog converter (DAC) circuitry and the baseband circuitry 504 may include a digital baseband interface to communicate with the RF circuitry 506.

In some dual-mode embodiments, a separate radio IC circuitry may be provided for processing signals for each spectrum, although the scope of the embodiments is not limited in this respect.

In some embodiments, the synthesizer' circuitry 506d may be a fractional-N synthesizer or a fractional N/N+1 synthesizer, although the scope of the embodiments is not limited in this respect as other types of frequency synthesizers may be suitable. For example, synthesizer circuitry 506d may be a delta-sigma synthesizer, a frequency multiplier, or a synthesizer comprising a phase-locked loop with a frequency divider.

The synthesizer circuitry 506d may be configured to synthesize an output frequency for use by the mixer circuitry 506a of the RF circuitry 506 based on a frequency input and a divider control input. In some embodiments, the synthesizer circuitry 506d may be a fractional N/N+1 synthesizer.

In some embodiments, frequency input may be provided by a voltage controlled oscillator (VCO), although that is not a requirement. Divider control input may be provided by either the baseband circuitry 504 or the applications processor 502 depending on the desired output frequency. In some embodiments, a divider control input (e.g., N) may be determined from a look-up table based on a channel indicated by the applications processor 502.

Synthesizer circuitry 506d of the RF circuitry 506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 506d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 506 may include an IQ/polar converter.

FEM circuitry 508 may include a receive signal path which may include circuitry configured to operate on RF signals received from one or more antennas 510, amplify the received signals and provide the amplified versions of the received signals to the RF circuitry 506 for further processing. FEM circuitry 508 may also include a transmit signal path which may include circuitry configured to amplify signals for transmission provided by the RF circuitry 506 for transmission by one or more of the one or more antennas 510.

In some embodiments, the FEM circuitry 508 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals . and provide the amplified received RF signals as an output (e.g., to the RF circuitry 506). The transmit signal path of the FEM circuitry 508 may include a power amplifier (PA) to amplify input RF signals (e.g., provided by RF circuitry 506), and one or more filters to generate RF signals for subsequent transmission (e.g., by one or more of the one or more antennas 510.

In some embodiments, the electronic device 500 may include additional elements such as, for example, memory/storage, display, camera, sensor, and/or input/output (I/O) interface.

In some embodiments, the electronic device 500 may be configured to perform one or more methods, processes, and/or techniques, or one or more portions thereof, as described herein.

Some non-limiting examples are provided below.

Example 1 may include circuitry for User Equipment (UE), comprising: Wireless Local Area Network (WLAN) baseband circuitry to control WLAN communication; and cellular baseband circuitry to control communication with a cellular network including to receive a Radio Resource Control (RRC)ConnectionReconfiguration message that includes WLAN measurement configuration information to indicate a WLAN Group of plural WLAN access points (APs) and to direct the WLAN baseband circuitry to monitor the WLAN APs of the WLAN Group.

Example 2 may include the circuitry for UE of example 1 wherein the WLAN baseband circuitry further is to perform measurement of the WLAN APs in the WLAN Group.

Example 3 may include the circuitry for UE of example 2 wherein the measurement of the WLAN APs in the WLAN Group includes a Received Signal Strength Indicator (RSSI) measurement.

Example 4 may include the circuitry for UE of any of examples 2-3 wherein the WLAN baseband circuitry further is to report to the cellular network the measurement of the WLAN APs of the WLAN Group.

Example 5 may include the circuitry for UE of example 4 wherein the measurement of a first WLAN AP of the WLAN APs in the WLAN Group indicates greater performance than the measurement of the other WLAN APs in the WLAN Group and the WLAN baseband circuitry further is to report to the cellular network only the measurement of the one of the first WLAN AP with the measurement that indicates greater performance.

Example 6 may include the circuitry for UE of example 4 wherein the WLAN baseband circuitry further is to perform measurement of neighbor WLAN APs not in the WLAN Group and wherein the WLAN measurement configuration information further includes a criterion to report to the cellular network the measurement of the WLAN APs of the WLAN Group and the measurement of the neighbor WLAN APs.

Example 7 may include the circuitry for UE of example 6 wherein the criterion includes that the measurement of the neighbor WLAN APs exceeds a preselected threshold.

Example 8 may include the circuitry for UE of example 6 wherein the criterion includes that the measurement of the WLAN APs of the WLAN Group is below a preselected threshold.

Example 9 may include the circuitry for UE of example 6 wherein the criterion includes that the measurement of the WLAN APs of the WLAN Group is below a first preselected threshold and that the measurement of the neighbor WLAN APs exceeds a second preselected threshold.

Example 10 may include the circuitry for UE of any of examples 1-9 wherein the cellular baseband circuitry is to report to the cellular network an WLANConnectionStatusReport to indicate a status of communication between the UE and the WLAN Group.

Example 11 may include the circuitry for UE of example 10 wherein the status of communication between the UE and the WLAN Group includes that the UE is not in communication with the WLAN Group.

Example 12 may include the circuitry for UE of example 10 wherein the status of communication between the UE and the WLAN Group includes that the UE is in communication with the WLAN Group.

Example 13 may include the circuitry for UE of any of examples 1-9, 11, and 12 wherein the WLAN measurement configuration information includes one or more of Homogenous Extended Service Set Identifiers, (HESSIDs), Basic Service Set Identifiers (BSSIDs), and Service Set Identifiers (SSIDs) for the plural WLAN APs of the WLAN Group.

Example 14 may include the circuitry for UE of any of examples 1-9, 11, and 12 wherein the WLAN measurement configuration information includes WLAN Channels for the plural WLAN APs of the WLAN Group.

Example 15 may include the circuitry for UE of any of examples 1-9, 11, and 12 wherein the WLAN measurement configuration information includes WLAN bands for the plural WLAN APs of the WLAN Group.

Example 16 may include the circuitry for UE of any of examples 2-8, 11, and 12 wherein the WLAN baseband circuitry further is to communicate with a first WLAN AP of the WLAN APs in the WLAN Group based upon the measurement of the WLAN APs in the WLAN Group.

Example 17 may include an evolved NodeB (eNB), comprising: radio frequency (RF) circuitry; and cellular baseband circuitry, coupled with the RF circuitry, to: transmit to a User Equipment (UE) a Radio Resource Control (RRC)ConnectionReconfiguration message that includes Wireless Local Area Network (WLAN) measurement configuration information to indicate a WLAN Group of plural WLAN access points (APs) to direct the UE to perform a measurement of the WLAN APs of the WLAN Group.

Example 18 may include the eNB of example 17 wherein the RF circuitry further is to receive from the UE measurement of the WLAN APs in the WLAN Group.

Example 19 may include the eNB of example 18 wherein the measurement of the WLAN APs in the WLAN Group includes a Received Signal Strength Indicator (RSSI) measurement.

Example 20 may include the eNB of any of examples 18-19 wherein the RF circuitry further is to receive, from the UE, measurement of neighbor WLAN APs not in the WLAN Group and wherein the WLAN measurement configuration information further includes a criterion for the UE to transmit to the eNB the measurement of the WLAN APs of the WLAN Group and the measurement of the neighbor WLAN APs.

Example 21 may include the eNB of example 20 wherein the criterion includes that the measurement of the neighbor WLAN APs exceeds a preselected threshold.

Example 22 may include the eNB of example 20 wherein the criterion includes that the measurement of the WLAN APs of the WLAN Group is below a preselected threshold.

Example 23 may include the eNB of example 20 wherein the criterion includes that the measurement of the WLAN APs of the WLAN Group is below a first preselected threshold and that the measurement of the neighbor WLAN APs exceeds a second preselected threshold.

Example 24 may include the eNB of any of examples 17-23 wherein the RF circuitry further is to receive from the UE an WLANConnectionStatusReport to indicate a status of communication between the UE and the WLAN Group.

Example 25 may include the eNB of example 24 wherein the status of communication between the UE and the WLAN includes that the UE is not in communication with the WLAN Group.

Example 26 may include the eNB of example 24 wherein the status of communication between the UE and the WLAN includes that the UE is in communication with the WLAN Group.

Example 27 may include the eNB any of examples 17-23 wherein the WLAN measurement configuration information includes one or more of Homogenous Extended Service Set Identifiers (HESSIDs), Basic Service Set Identifiers (BSSIDs), and Service Set Identifiers (SSIDs) for the WLAN APs of the WLAN Group.

Example 28 may include the eNB of any of examples 17-23 wherein the WLAN measurement configuration information includes WLAN Channels for the WLAN APs of the WLAN Group.

Example 29 may include the eNB of any of examples 17-23 wherein the WLAN measurement configuration information includes WLAN Bands for the WLAN APs of the WLAN Group.

Example 30 may include the eNB of any of examples 17-23 wherein the Radio Resource Control (RRC) Connection Reconfiguration message includes timing criteria that set one or more times at which the UE is to provide the WLANConnectionStatusReport.

Example 31 may include one or more computer-readable media having instructions stored thereon, wherein the instructions, in response to execution by a device, cause the device to: receive a Radio Resource Control (RRC)ConnectionReconfiguration message that includes WLAN measurement configuration information to indicate a WLAN Group of plural WLAN access points (APs); and perform measurement of the WLAN APs in the WLAN Group.

Example 32 may include the one or more computer-readable media of example 31 wherein the measurement of the WLAN APs in the WLAN Group includes a Received Signal Strength Indicator (RSSI) measurement.

Example 33 may include the one or more computer-readable media of example 31 further including instructions to cause the device to transmit the measurement of the WLAN APs in the WLAN Group.

Example 34 may include the one or more computer-readable media of any of examples 31-33 wherein the measurement of a first WLAN AP of the WLAN APs in the WLAN Group indicates greater performance than the measurement of the other WLAN APs in the WLAN Group and the one or more computer-readable media further include instructions to cause the device to report only the measurement of the first WLAN AP of the WLAN APs.

Example 35 may include the one or more computer-readable media of any of examples 31-33 further including instructions to perform measurement of neighbor WLAN APs not in the WLAN Group and wherein the WLAN measurement configuration information further includes a criterion to transmit the measurement of the WLAN APs in the WLAN Group and the measurement of the neighbor WLAN APs.

Example 36 may include the one or more computer-readable media of any of examples 31-33 further including instructions to cause the device to transmit an WLANConnectionStatusReport to indicate a status of communication between the device and the WLAN Group.

Example 37 may include the one or more computer-readable media of example 36 wherein the status of communication between the device and the WLAN includes that the device is not in communication with the WLAN Group.

Example 38 may include the one or more computer-readable media of example 36 wherein the status of communication between the device and the WLAN includes that the device is in communication with the WLAN Group.

Example 39 may include the one or more computer-readable media of any of examples 31-38 further including instructions to cause the device to communicate with a first WLAN AP of the WLAN APs in the WLAN Group based upon the measurement of the WLAN APs in the WLAN Group.

Example 40 may include a method performed by a User Equipment (UE), comprising: receiving a Radio Resource Control (RRC)ConnectionReconfiguration message that includes WLAN measurement configuration information to indicate a WLAN Group of plural WLAN access points (APs); and performing measurement of the WLAN APs in the WLAN Group.

Example 41 may include the method of example 40 wherein the measurement of the WLAN APs in the WLAN Group includes a Received Signal Strength Indicator (RSSI) measurement.

Example 42 may include the method of example 40 further including transmitting one or more measurements of the WLAN APs to a cellular network.

Example 43 may include the method of any of examples 40-42 wherein the measurement of a first WLAN AP of the WLAN APs in the WLAN Group indicates greater performance than the measurement of the other WLAN APs in the WLAN Group and method further includes reporting only the measurement of the first WLAN AP.

Example 44 may include the method of any of examples 40-42 wherein the WLAN measurement configuration information further includes a criterion to transmit the one or more measurements of the WLAN APs.

Example 45 may include the method of any of examples 40-42 further including transmitting an WLANConnectionStatusReport to indicate a status of communication between the UE and the WLAN Group.

Example 46 may include the method of example 45 wherein the status of communication between the UE and the WLAN includes that the UE is not in communication with the WLAN Group.

Example 46 may include the method of example 46 further including an indication of one of plural reasons why the UE is not in communication with the WLAN Group.

Example 48 may include the method of example 45 wherein the status of communication between the UE and the WLAN includes that the UE is in communication with the WLAN Group.

Example 49 may include the method of any of examples 40-48 further comprising connecting to one of the WLAN APs in the WLAN Group based upon the measurement of the WLAN APs in the WLAN Group.

The description herein of illustrated implementations, including what is described in the Abstract, is not intended to be exhaustive or to limit the present disclosure to the precise forms disclosed. While specific implementations and examples are described herein for illustrative purposes, various equivalent modifications are possible within the scope of the disclosure, as those skilled in the relevant art will recognize. These modifications may be made to the disclosure in light of the above detailed description.

What is claimed is:
1. Circuitry for User Equipment (UE), comprising:
Wireless Local Area Network (WLAN) baseband circuitry to control WLAN communication; and
cellular baseband circuitry to control communication with a cellular network, wherein the cellular baseband circuitry is to:
receive a Radio Resource Control (RRC) Connection Reconfiguration message that includes WLAN measurement configuration information to indicate a WLAN Group of plural WLAN access points (APs);

direct the WLAN baseband circuitry to monitor the WLAN APs of the WLAN Group;
determine a station count indicating a count of WLAN stations connected to the WLAN APs in the WLAN Group based on monitoring the WLAN APs of the WLAN Group; and
transmit, to an eNB, a status indication to indicate that a WLAN provided by a first WLAN AP of the plural WLAN APs is not available or to indicate that the UE is successfully associated with the WLAN.

2. The circuitry for UE of claim 1 wherein the WLAN baseband circuitry further is to perform measurement of the WLAN APs in the WLAN Group.

3. The circuitry for UE of claim 2 wherein the WLAN baseband circuitry further is to communicate with a first WLAN AP of the WLAN APs in the WLAN Group based upon the measurement of the WLAN APs in the WLAN Group.

4. The circuitry for UE of claim 2 wherein the WLAN baseband circuitry further is to report to the cellular network the measurement of the WLAN APs of the WLAN Group.

5. The circuitry for UE of claim 4 wherein the measurement of a first WLAN AP of the WLAN APs in the WLAN Group indicates greater performance than the measurement of the other WLAN APs in the WLAN Group and the WLAN baseband circuitry further is to report to the cellular network only the measurement of the first WLAN AP.

6. The circuitry for UE of claim 4 wherein the WLAN baseband circuitry further is to perform measurement of neighbor WLAN APs not in the WLAN Group and wherein the WLAN measurement configuration information further includes a criterion to report to the cellular network the measurement of the WLAN APs of the WLAN Group and the measurement of the neighbor WLAN APs.

7. The circuitry for UE of claim 6 wherein the criterion includes that the measurement of the neighbor WLAN APs exceeds a preselected threshold.

8. The circuitry for UE of claim 6 wherein the criterion includes that the measurement of the WLAN APs of the WLAN Group is below a preselected threshold.

9. The circuitry for UE of claim 6 wherein the criterion includes that the measurement of the WLAN APs of the WLAN Group is below a first preselected threshold and that the measurement of the neighbor WLAN APs exceeds a second preselected threshold.

10. The circuitry for UE of claim 1 wherein the cellular baseband circuitry is to report the status indication to the eNB in a WLAN connection status report.

11. An evolved NodeB (eNB), comprising:
radio frequency (RF) circuitry; and
cellular baseband circuitry, coupled with the RF circuitry, to:
transmit to a User Equipment (UE) a Radio Resource Control (RRC) Connection Reconfiguration message that includes Wireless Local Area Network (WLAN) measurement configuration information to indicate a WLAN Group of plural WLAN access points (APs) to:
direct the UE to perform a measurement of the WLAN APs of the WLAN Group;
determine a station count indicating a count of WLAN stations connected to the WLAN APs in the WLAN Group based on monitoring the WLAN APs of the WLAN Group; and
receive, from the UE, a status indication to indicate that a WLAN provided by a first WLAN AP of the plural WLAN APs is not available were to indicate that the UE is successfully associated with the WLAN.

12. The eNB of claim 11 wherein the RF circuitry further is to receive, from the UE, measurement of the WLAN APs in the WLAN Group.

13. The eNB of claim 12 wherein the RF circuitry further is to receive, from the UE, measurement of neighbor WLAN APs not in the WLAN Group and wherein the WLAN measurement configuration information further includes a criterion for the UE to transmit to the eNB the measurement of the WLAN APs of the WLAN Group and the measurement of the neighbor WLAN APs.

14. The eNB of claim 13 wherein the criterion includes that the measurement of the neighbor WLAN APs exceeds a preselected threshold.

15. The eNB of claim 13 wherein the criterion includes that the measurement of the WLAN APs of the WLAN Group is below a preselected threshold.

16. The eNB of claim 13 wherein the criterion includes that the measurement of the WLAN APs of the WLAN Group is below a first preselected threshold and that the measurement of the neighbor WLAN APs exceeds a second preselected threshold.

17. The eNB of claim 11 wherein the RF circuitry further is to receive the status indication from the UE in a WLAN connection status report.

18. The eNB of claim 17 wherein the Radio Resource Control (RRC) Connection Reconfiguration message includes timing criteria that set one or more times at which the UE is to provide the WLAN connection status report.

19. One or more non-transitory, computer-readable media having instructions stored thereon, wherein the instructions, in response to execution by a device, cause the device to:
receive a Radio Resource Control (RRC) Connection Reconfiguration message that includes WLAN measurement configuration information to indicate a WLAN Group of plural WLAN access points (APs);
perform measurement of the WLAN APs in the WLAN Group;
determine a station count indicating a count of WLAN stations connected to the WLAN APs in the WLAN Group based on monitoring the WLAN APs of the WLAN Group; and
generate a message to be transmitted to an eNB, the message to include a status indication to indicate that a WLAN provided by a first WLAN AP of the plural WLAN APs is not available or to indicate that the UE is successfully associated with the WLAN.

20. The one or more non-transitory, computer-readable media of claim 19 wherein the measurement of the WLAN APs in the WLAN Group includes a Received Signal Strength Indicator (RSSI) measurement.

21. The one or more non-transitory, computer-readable media of claim 19 further including instructions to cause the device to transmit the message in a WLAN connection status report.

22. The one or more non-transitory, computer-readable media of claim 19 further including instructions to cause the device to communicate with a first WLAN AP of the WLAN APs in the WLAN Group based upon the measurement of the WLAN APs in the WLAN Group.

23. The one or more non-transitory, computer-readable media of claim 19, wherein the status indication is to indicate that the WLAN is not available and is to further indicate a reason that the WLAN is not available.

24. The one or more non-transitory, computer-readable media of claim 23, wherein the reason is that the WLAN has been turned off.

25. The one or more non-transitory, computer-readable media of claim 19 further including instructions to cause the device to: receive, from the eNB, reporting conditions or criteria; and transmit the message to the eNB based on the reporting conditions or criteria.

* * * * *

UNITED STATES PATENT AND TRADEMARK OFFICE
CERTIFICATE OF CORRECTION

PATENT NO.        : 10,750,392 B2
APPLICATION NO.   : 15/746341
DATED             : August 18, 2020
INVENTOR(S)       : Alexander Sirotkin et al.

Page 1 of 1

It is certified that error appears in the above-identified patent and that said Letters Patent is hereby corrected as shown below:

On the Title Page

Following item [72], after "Inventors: Alexander Sirotkin," replace "Petach Tikva, M (IL);" with
-- Petah Tikva, M (IL); --.

Signed and Sealed this
Thirteenth Day of October, 2020

Andrei Iancu
*Director of the United States Patent and Trademark Office*